United States Patent [19]

Struck et al.

[11] Patent Number: 5,119,303
[45] Date of Patent: Jun. 2, 1992

[54] BRAKE-FORCE CONTROL SYSTEM FOR VEHICLES

[75] Inventors: Helmut Struck, Winnenden; Gerhard Fischle, Esslingen; Bernhard Lehmann, Appenweier, all of Fed. Rep. of Germany

[73] Assignee: Daimler-Benz AG, Fed. Rep. of Germany

[21] Appl. No.: 454,858

[22] Filed: Dec. 22, 1989

[30] Foreign Application Priority Data

Dec. 23, 1988 [DE] Fed. Rep. of Germany ....... 3843520

[51] Int. Cl.⁵ .............................................. B60T 8/32
[52] U.S. Cl. ................................ 364/426.02; 303/96; 303/100
[58] Field of Search ...................... 364/426.02, 426.03, 364/424.05; 303/96–100; 180/197

[56] References Cited

U.S. PATENT DOCUMENTS

| 4,759,589 | 7/1988 | Leiber | 364/426.02 |
| 4,759,590 | 7/1988 | Uchida et al. | 364/426.02 |
| 4,770,266 | 9/1988 | Yamaguchi et al. | 364/426.02 |
| 4,793,662 | 12/1988 | Arikawa | 364/426.02 |
| 4,837,694 | 6/1989 | Narita et al. | 364/426.02 |
| 4,852,009 | 7/1989 | Jonner et al. | 364/426.02 |

FOREIGN PATENT DOCUMENTS

| 2518196 | 11/1976 | Fed. Rep. of Germany . |
| 3421700 | 12/1984 | Fed. Rep. of Germany . |
| 3627550 | 2/1988 | Fed. Rep. of Germany . |

*Primary Examiner*—Parshotam S. Lall
*Assistant Examiner*—Tyrone Queen
*Attorney, Agent, or Firm*—Evenson, Wands, Edwards, Lenahan & McKeown

[57] ABSTRACT

Brake-force control system (ABS) for vehicles, in particular motor vehicles, with separate control of the front wheel brakes and with joint or separate rear wheel brakes which can be switched over to "select high" control or individual control and/or with a limited-slip differential at the rear axle, the switchover of the rear wheel brakes and/or of the limited-slip differential being effected at different coefficients of friction (μ-split) with a specifiable rate of rise dependent on the travelling speed, and in which, in order to increase directional stability during a braking procedure, a switching device is provided which blocks a switchover of the rear wheel brakes and/or of the limited-slip differential until the travelling speed from the time of the detection of different coefficients of friction has decreased to a specified value, the rate of rise of the switchover being dependent at least one the duration of the reduction of the vehicle speed to the specified value.

9 Claims, 2 Drawing Sheets

BRAKE-FORCE CONTROL SYSTEM FOR VEHICLES

BACKGROUND AND SUMMARY OF THE INVENTION

The present invention generally relates to an anti-lock vehicle braking system (ABS), and more particularly, to such a system in which better stability of the vehicle is achieved during a braking procedure.

A vehicle braking system of the generic type, with an anti-lock system (ABS), is disclosed by German Published, Unexamined Patent Application 3,627,550. In this system, in the presence of different coefficients of friction ($\mu$-split) during an ABS-control procedure to shorten the braking distance, in the case of a four-channel ABS, the braking control method for the rear wheels is switched over from "select low" to "select high". In the case of a three-channel ABS, the response/slip threshold for the beginning of control of the rear wheel brakes is raised and in the case of a vehicle with ABS and an automatically slip-limitable differential (ASD) this differential is blocked. In order to avoid provoking a sudden yawing reaction of the vehicle due to this switchover, provision is made, at least at higher vehicle speeds, to permit the rise of the brake pressure at the wheel with the higher adhesion coefficient or the raising of the slip threshold or the rise in the blocking effect of the ASD only at a particular specifiable rate of rise.

A vehicle braking system with an anti-lock system has furthermore been disclosed by German Published, Unexamined Patent Application 3,421,700, in which, to avoid high yawing moments in the case of asymmetrical coefficient of friction of the roadway and overlong braking distances, the brakes on the vehicle side having the higher coefficient of friction can be controlled as a function of the brakes on the side having the lower coefficient of friction with a time delay to produce a clocked increase of the brake pressure.

An anti-lock system for vehicles is furthermore disclosed by German Published, Unexamined Patent Application 2,518,196, in which the control can be switched over between the operating modes "select low" and "select high" as a function of various conditions, a switchover to "select high" operation being prevented for a period specified by a timing element when certain criteria are present.

It is an object of the invention to provide an anti-lock vehicle braking system of the generic type with measures for shortening the braking distance under certain conditions in such a way that even better stability of the vehicle during the braking procedure is achieved.

Compared to anti-lock vehicle braking systems of the generic type discussed above, particular advantages are obtained by preferred embodiments of the invention which includes that, at the beginning of an ABS control procedure, the driver is first given the opportunity of correcting any yawing reaction which occurs and that a higher brake-force is switched in only after this so-called stabilization phase. Any yawing reaction which occurs can then be corrected again, with the result that overall a more stable ride in combination with shortening of the braking distance is achieved.

Other objects, advantages and novel features of the present invention will become apparent from the following detailed description of the invention when considered in conjunction with the accompanying drawings.

DETAILED DESCRIPTION OF THE DRAWINGS

Figure 1:
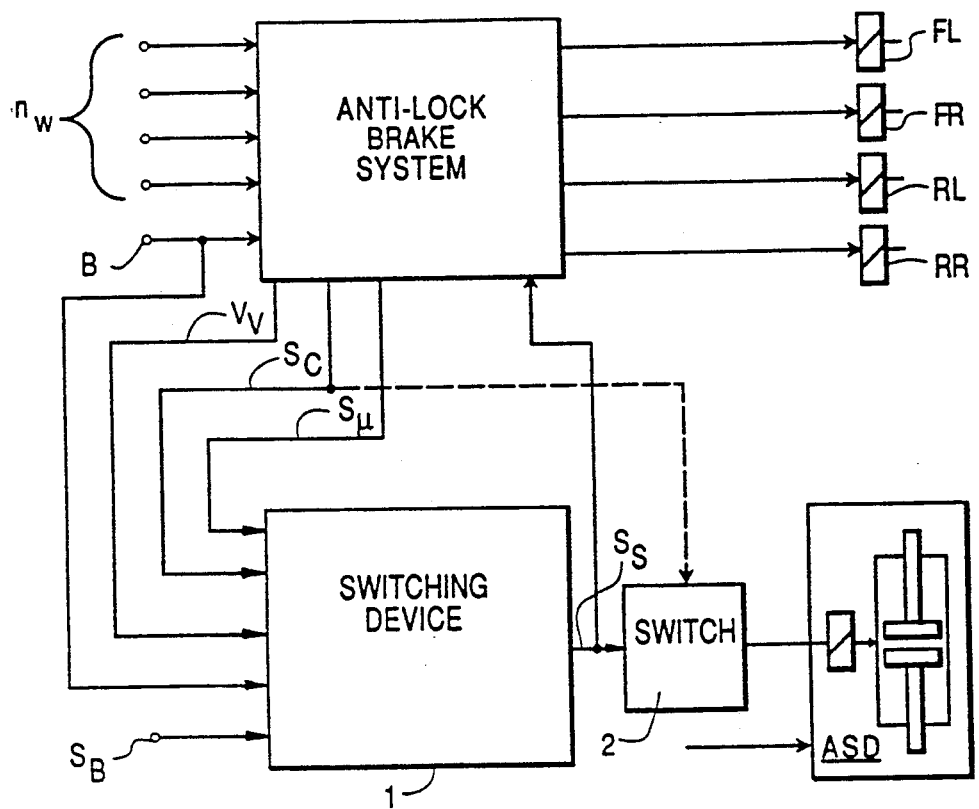
FIG. 1 shows a schematic representation of an anti-lock vehicle braking system.

An exemplary embodiment of the invention is illustrated in the drawings and is described below in greater detail.

The schematic representation in FIG. 1 shows a module designated ABS which contains the entire electronic system of the ABS for a vehicle and which is supplied with the signals $N_R$ generated by wheel speed sensors (not shown) and a signal B generated when a brake pedal (not shown) is actuated.

From these signals, the electronic system generates control signals in a manner known per se for the schematically represented, electromagnetically actuable control valves (3-way valves) FL, FR, RL, RR (front left, front right, rear left, rear right) for raising, lowering and holding constant a brake pressure at individual wheels of the vehicle.

Brake pressure control at the front wheels is here effected individually in known manner as a function of individual rotational behavior, and control of the rear wheels is effected according to the so-called "select low" principle, i.e. as a function of rotational behavior of the wheel with the smaller adhesion coefficient.

A switching device 1, according to a preferred embodiment of the invention, is contained, for example, in one single module. This switching device 1 is supplied, as input quantities, with a vehicle speed $V_F$, and a braking signal B which for the sake of simplicity is taken from the ABS since it is already present there. Also provided to the switching device 1 are a control signal $S_R$, which appears when a control procedure is taking place in the ABS, a detection signal $S\mu$, which appears when, by reason of the wheel speeds, different coefficients of friction are detected during a control procedure of the ABS, and a bend signal $S_K$, which contains information on the bend radius being travelled. The bend signal $S_K$, for example, is derived from a transverse acceleration transmitter, steering angle transmitter or yaw angle transmitter.

The output signal of the switching device 1 is supplied to the ABS electronic system as, for example, an analog switching signal $S_S$ and there effects a switchover of the rear wheel braking control method from "select low" to "select high" or provides individual control with a corresponding rate of rise of the brake pressure.

If, in addition to the ABS, the vehicle also has an automatically slip-limitable differential (ASD), which is usually switched off immediately when the ABS responds, the switching signal $S_S$ can also be used, in the case of a controlled braking, to block this ASD with a specified rate of rise. This possibility is likewise represented schematically in FIG. 1, wherein the control signal $S_R$ is additionally supplied to a switching element 2 of the ASD, by control of which, the switching signal $S_S$ can be released.

Figure 3:
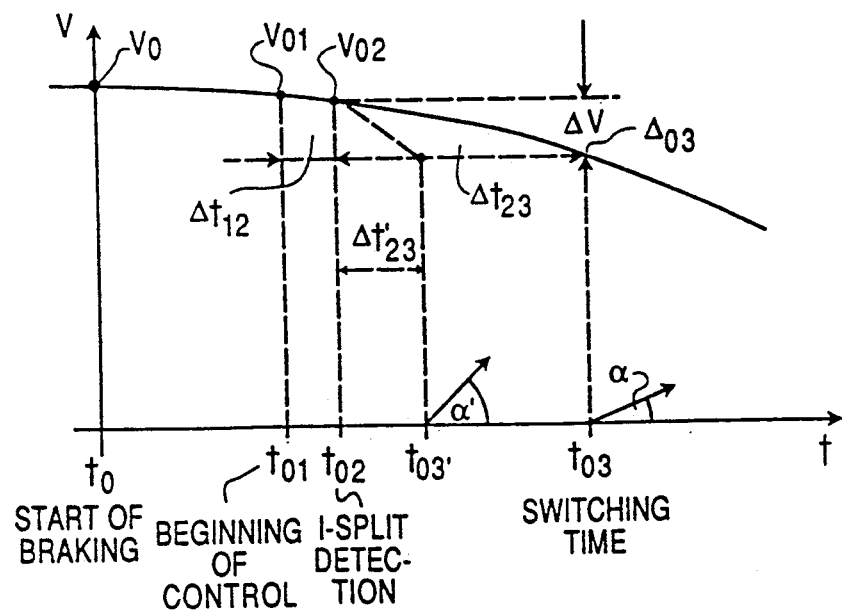
FIG. 3 shows a time-dependency diagram.
Figures 2, 2A:
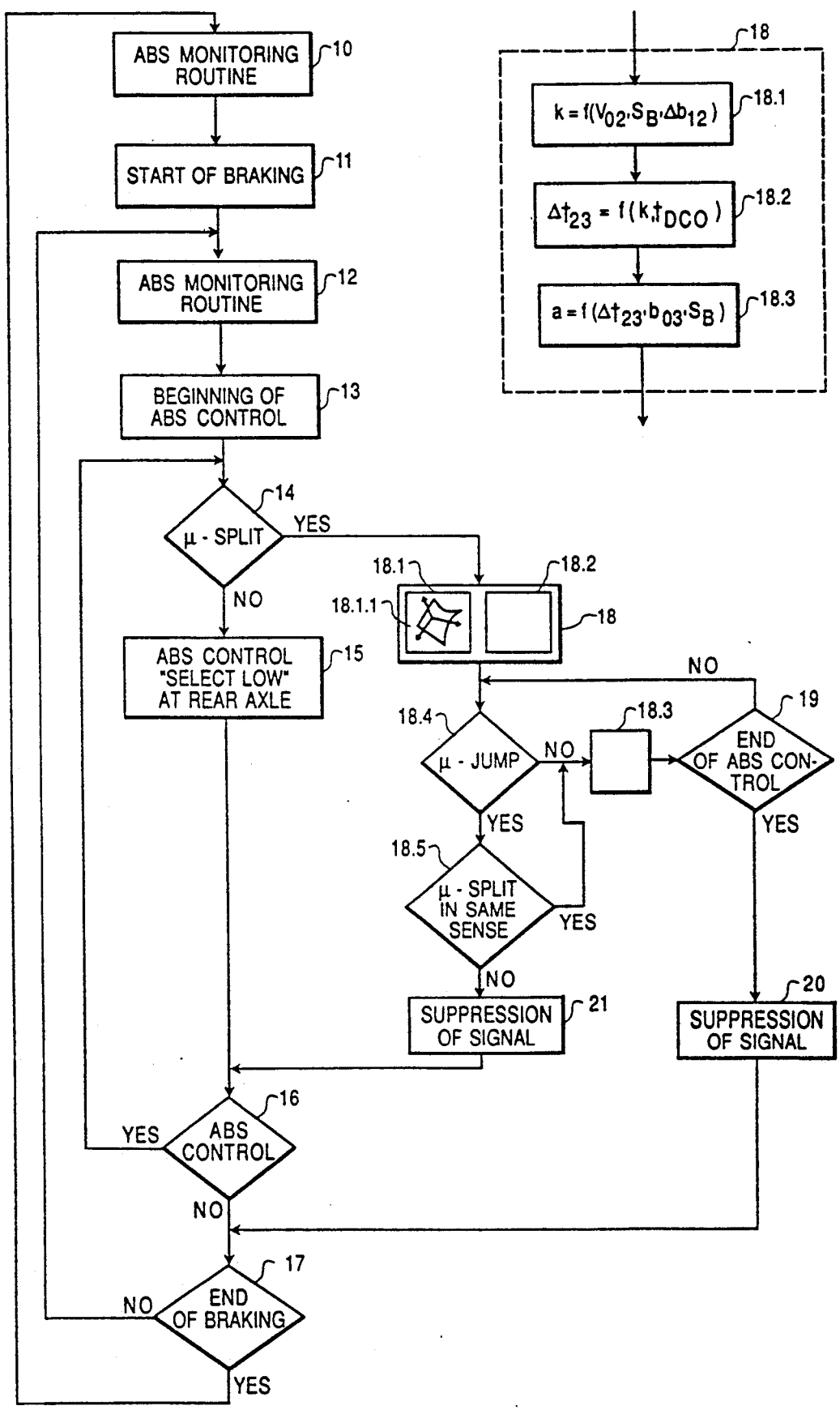
FIG. 2 shows a flow chart for the control of the anti-lock vehicle braking system.
FIG. 2a shows an associated routine for the control of the anti-lock vehicle braking system.

The functioning of the braking control system, in particular also of the switching device 1, is now described in greater detail in conjunction with FIGS. 2 and 3.

As the flow chart in FIG. 2 shows, a "monitoring routing for monitoring the wheel speeds $N_R$" runs in a program step 10 in the ABS module. If the driver now actuates the brake, i.e. brake signal B in FIG. 1 and program step 11, at time $t_0$ (See FIG. 3) then, in accordance with program step 12, a new monitoring routing is started in the ABS module. If the ABS detects the presence of different wheel speeds, then, in a program step 13, at time $t_{01}$, ABS control starts. At same time, $t_{02}$, in a program step 14, the ABS detects whether, on the basis of the wheel speeds, $\mu$-homogeneous or $\mu$-split is present.

If $\mu$-homogeneous is present, then, in accordance with program step 15, the ABS control is carried out in accordance with the select-low principle at the rear axle. In a program step 16, a test is then carried out to determine whether ABS control is still continuing. If yes, the sequence is set back to program step 14 and if no, a test is carried out in a program step 17 to determine whether the brake is still being actuated, that is, whether signal B is still present. If not, the sequence is set back to program step 10 and if yes, the sequence is set back to program step 12. If necessary, a new run is started.

However, if $\mu$-split is detected in program step 14, i.e. time $t_{02}$, the switching device 1 is correspondingly activated by the signal $S_\mu$ in which switching device, in a program step 18, in accordance with a routine 18.1, a factor k and, in a routine 18.2, the time $\Delta t_{23}$ is determined (See FIG. 2a).

The factor k is, for example, read from a characteristic diagram memory 18.1.1 using the signal quantities $v_{02}$ and $S_K$ at time $t_{02}$, the vehicle deceleration $\Delta b_{12}$ in the period $\Delta t_{12}$, and the time $\Delta t_{12}$. In the routine 18.2, the product $(k \cdot v_{02})$ and thus the value $v_{03}$ is then specified, the factor being of the order of, for example, 0.85, and the duration $\Delta t_{23}$ is then calculated. It is possible, in the context of a plausibility check, for the duration $\Delta t_{23}$ to be corrected by reaction and disturbance-correction times $t_{DCO}$ obtained from a series of tests with ordinary drivers.

If the vehicle speed has now decreased to the specified value $v_{03}$ and if, in this time, no $\mu$ jump has occurred, routine 18.4, then, in routine 18.3, using the duration $\Delta t_{23}$, the instantaneously attained braking deceleration $b_{03}$ and the quantity $S_K$, the rate of rise $\alpha$ of the switchover of the rear wheel brakes and/or of the limited-slip differential is determined. This is initiated at switching time $t_{03}$ by the switching signal $S_S$ if it is established, in accordance with a program step 19, that the ABS control procedure is still continuing. If, on the other hand, the control procedure is already at an end, then, in accordance with a program step 20, the switching signal $S_S$ is suppressed, i.e. no switchover is initiated, and the program is advanced to program step 17.

If, however, a $\mu$ jump has occurred in the time in which the vehicle speed has decreased to the value $v_{03}$, then, in routine 18.5, a test is carried out to determine whether the jump in the case of $\mu$-split is in the same sense. If this is the case, the program is advanced to routine 18.3, and in this routing the rate of rise is adjusted to the new $\mu$-split condition. If this is not the case, then, in a program step 21, the switching signal $S_S$ is suppressed and the program is advanced to program step 16, in which a test is then carried out to determine whether the ABS control is still continuing. If yes, the sequence is set back again to program step 14 and continued until the ABS ceases to control. If ABS control is at an end, then, in program step 17, a test is carried out to determine whether the brake is still being actuated. If braking is not yet at an end, the sequence is set back to program step 12, while, if braking is at an end, the program run is also at an end and the program is switched back to program step 10.

This braking control system thus gives the driver the opportunity of correcting a possible yawing reaction occurring at the beginning of an ABS control procedure even before the rear wheel brakes or the limited-slip differential is switched over, since the switchover occurs only after a time delay, i.e. after a stabilization phase.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An anti-lock vehicle braking system for a motor vehicle comprising:
    an anti-wheel lock means for separately controlling each front wheel of the vehicle and for subjecting rear wheels of the vehicle to one of joint and separate control; and
    a switching means for switching between the joint and separate control of the rear wheels when different coefficients of friction between left-hand and right-hand wheels of the vehicle are present, operation of the switching means being effected at a specifiable rate of rise of brake pressure dependent on a vehicle speed signal,
    wherein the switching means delays the switchover of the rear wheels until the vehicle speed signal has decreased from a value at a time of the detection of the different coefficients of friction to a specified value; and
    wherein the rate of rise is dependent at least on a duration of the fall of the vehicle speed signal to the specified value.

2. An anti-lock vehicle braking system according to claim 1, wherein the specifiable value of the vehicle speed is determined by multiplication of the vehicle speed, measured at the time of the detection of different coefficients of friction, by a factor which is dependent on the vehicle speed measured at the time of detection of different coefficients of friction.

3. An anti-lock vehicle braking system according to claim 2, wherein the factor is additionally dependent on a difference in the vehicle deceleration between a time at a beginning of control and the time of the detection of different coefficients of friction.

4. An anti-lock vehicle braking system according to claim 2, wherein the factor is additionally dependent on the length of the time between the beginning of control and the time of the detection of different coefficients of friction as a function of the vehicle speed.

5. An anti-lock vehicle braking system according to claim 2, wherein the factor is additionally dependent on one of an instantaneously travelled bend radius and on parameters associated with the latter.

6. An anti-lock vehicle braking system according to claim 1, wherein the rate of rise is additionally dependent on a braking deceleration achieved at a switching time of the switching means.

7. An anti-lock vehicle braking system according to claim 1, wherein the rate of rise is additionally dependent on one of a bend radius being travelled at a switching time of the switching device and on parameters associated with said bend radius.

8. An anti-lock vehicle braking system according to claim 1, wherein the duration is additionally dependent on reaction and disturbance-correction times obtained from a series of tests with ordinary drivers.

9. An anti-lock vehicle braking system according to claim 1, futher comprising a limited-slip differential which is switched on for connecting together the rear wheels of the vehicle, wherein the switching off means further controls the switching of the limited-slip differential when different coefficients of friction are present.

* * * * *